(12) United States Patent
Kusakabe

(10) Patent No.: US 9,001,372 B2
(45) Date of Patent: Apr. 7, 2015

(54) INFORMATION PROCESSING APPARATUS, INFORMATION PROCESSING METHOD, AND RECORDING MEDIUM

(71) Applicant: Canon Kabushiki Kaisha, Tokyo (JP)

(72) Inventor: Yuki Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 13/843,032

(22) Filed: Mar. 15, 2013

(65) Prior Publication Data

US 2013/0278968 A1    Oct. 24, 2013

(30) Foreign Application Priority Data

Mar. 28, 2012 (JP) ................................. 2012-074852

(51) Int. Cl.
*G06K 15/00* (2006.01)
*H04N 1/21* (2006.01)

(52) U.S. Cl.
CPC ...................................... *H04N 1/21* (2013.01)

(58) Field of Classification Search
USPC ....................................... 358/1.13, 1.1, 1.15
See application file for complete search history.

(56) References Cited

U.S. PATENT DOCUMENTS

| | | | |
|---|---|---|---|
| 2007/0013945 A1* | 1/2007 | Yoshida et al. | 358/1.15 |
| 2007/0174521 A1* | 7/2007 | Aritomi | 710/62 |
| 2007/0195357 A1* | 8/2007 | Matsuba | 358/1.15 |
| 2008/0151299 A1* | 6/2008 | Takahata | 358/1.15 |
| 2011/0279859 A1* | 11/2011 | Hashimoto | 358/1.15 |

FOREIGN PATENT DOCUMENTS

JP    2001-169065 A    6/2001

* cited by examiner

*Primary Examiner* — Martin Mushambo
(74) *Attorney, Agent, or Firm* — Canon U.S.A., Inc., IP Division

(57) ABSTRACT

An information processing apparatus acquires storage location information representing a storage location of an image file in a first external information processing apparatus from an image reading apparatus, and determines whether the storage location of the image file can store the image file based on the acquired storage location information. When it determines that the storage location of the image file can store the image file, it acquires screen information used to generate a screen for generating a scan ticket designating a storage location, from a second external information processing apparatus, and displays the screen for generating the scan ticket based on the acquired screen information.

9 Claims, 16 Drawing Sheets

FIG.6

```
SCAN TICKET ID: T0001
RESOLUTION: 600 × 600dpi
COLOR MODE: COLOR
MAGNIFICATION: 100%
TWO-SIDED READING: TWO-SIDED
READING SIZE: A4
DOCUMENT FILE NAME: doc0001.pdf
STORAGE DESTINATION: http://documentservice.com/folder/
OCR PROCESSING: YES
```

FIG.7

| SCAN TICKET ID | RESOLUTION | COLOR MODE | MAGNIFICATION | READING SIZE | DOCUMENT FILE NAME | STORAGE DESTINATION | OCR PROCESSING |
|---|---|---|---|---|---|---|---|
| T0001 | 600×600 | COLOR | 100 | A4 | doc0001.pdf | http://documentservice.com/folder | YES |
| T0002 | 300×300 | MONOCHROME | 100 | A4 | doc0002.pdf | http://documentservice.com/folder | NO |
| T0003 | 600×600 | AUTOMATIC | 100 | A4 | doc0003.pdf | http://documentservice.com/folder | YES |
| T0004 | 300×300 | COLOR | 100 | A4 | doc0004.pdf | http://documentservice.com/folder | YES |

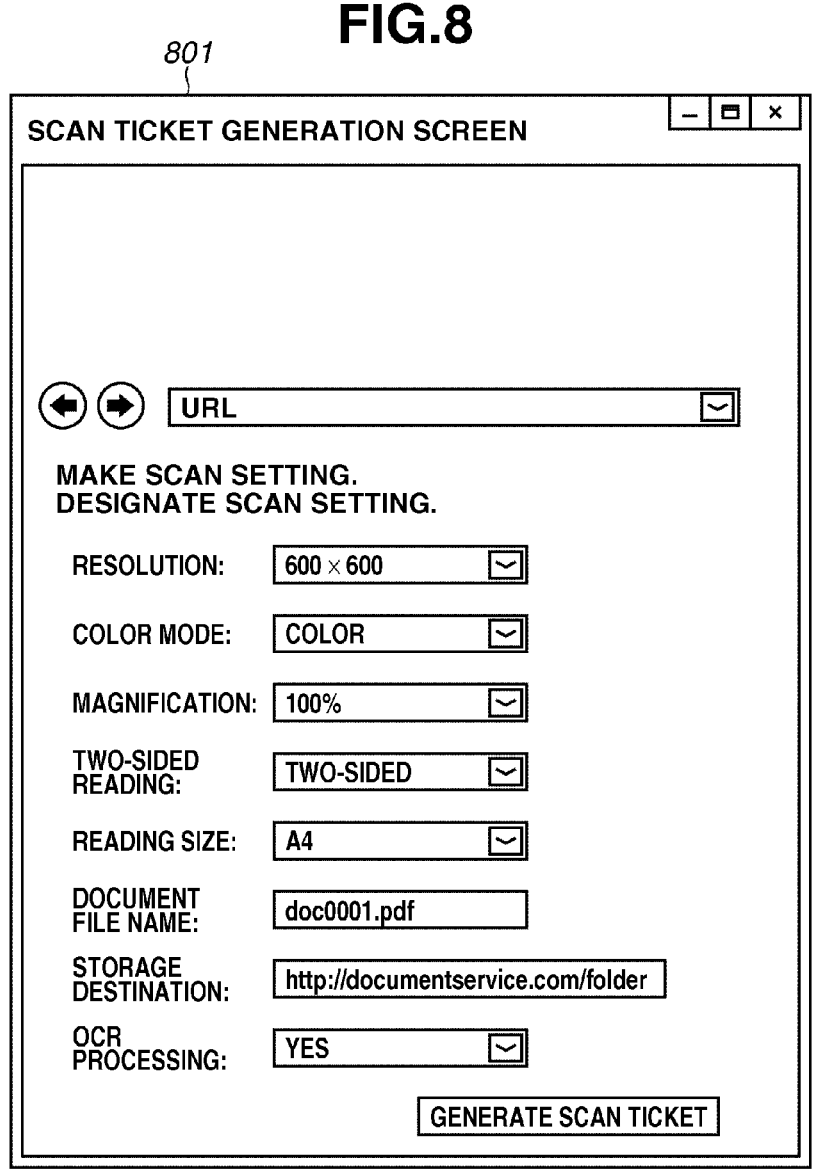

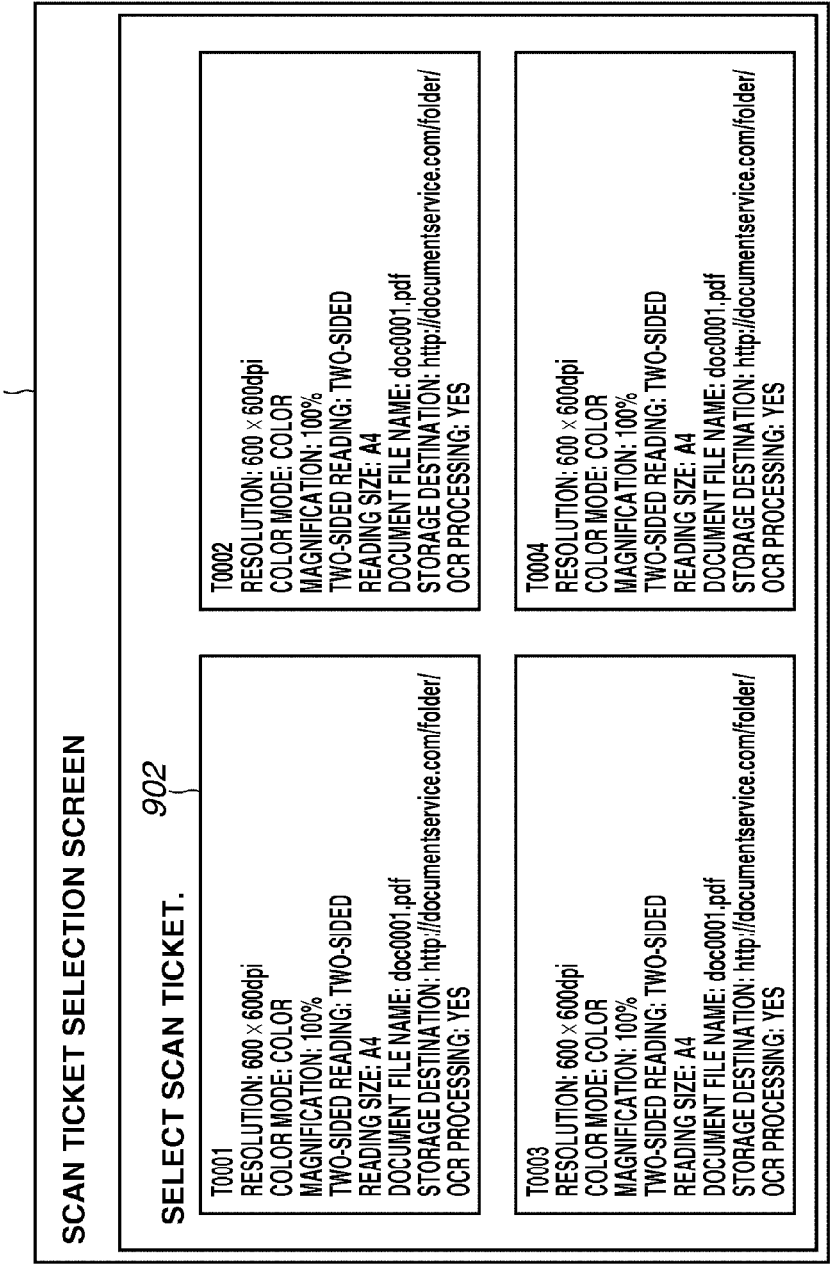

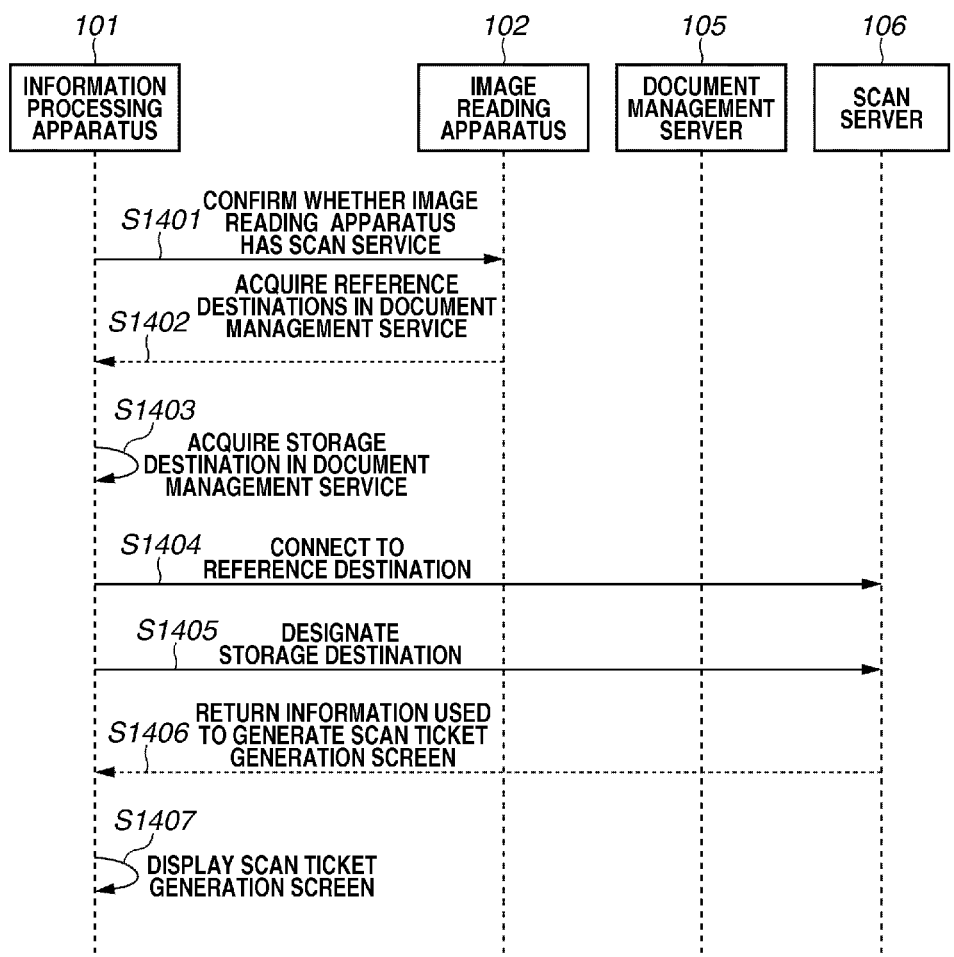

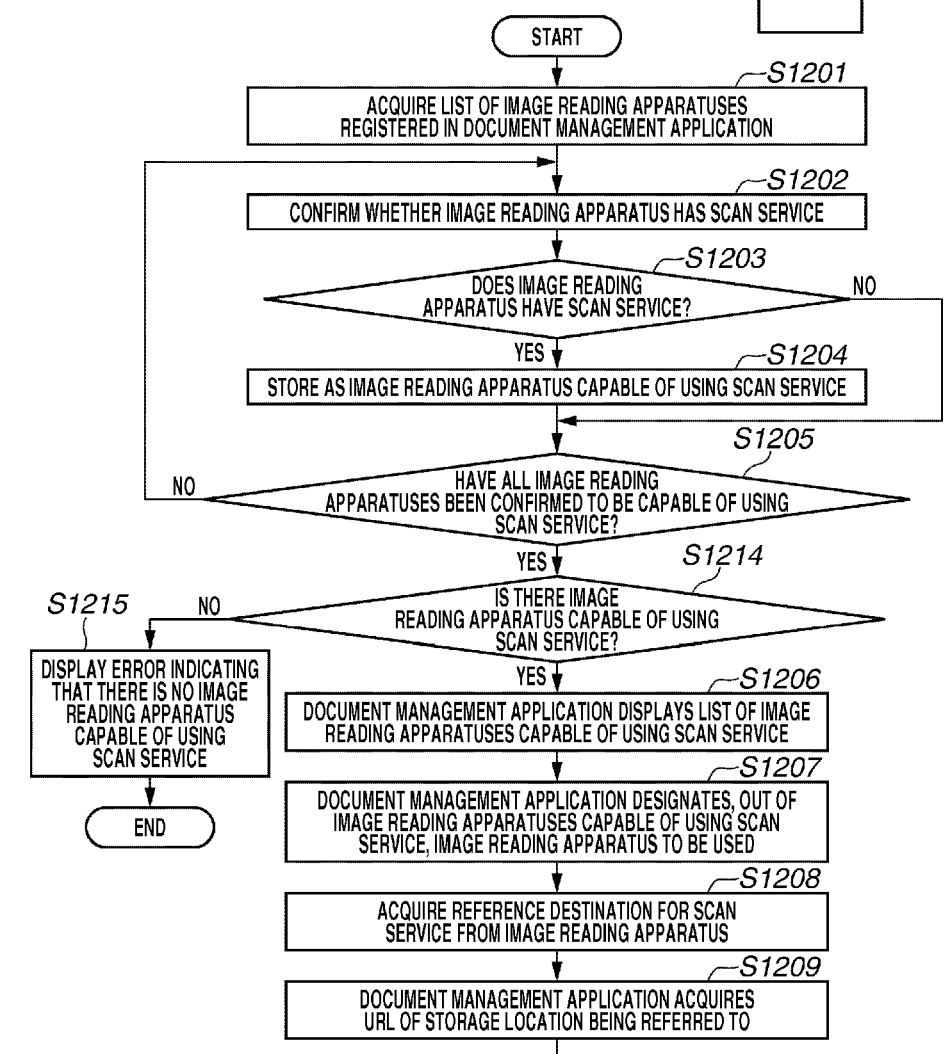

INFORMATION PROCESSING APPARATUS, INFORMATION PROCESSING METHOD, AND RECORDING MEDIUM

BACKGROUND OF THE INVENTION

1. Field of the Invention

Aspects of the present invention generally relate to an information processing apparatus, an information processing method, and a recording medium.

2. Description of the Related Art

Conventionally, a user stores and manages resources of a computer themselves, and utilizes various functions using the resources. In recent years, such a function has been increasingly utilized using the Internet and a fee is paid according to its use. Offer of the function is referred to as provision of a service. Offer of the function using the Internet is referred to as provision of a cloud service. The cloud service that has already been implemented includes a scan service and an online storage service.

In the scan service, an external computer performs various types of processing when an image (scan data) read by an image reading apparatus is converted into an image file. According to the scan service, a high-value image file (a high-compression portable document format (PDF), a PDF that has been subjected to optical character reader (OCR) processing (OCRed), etc.) can be generated without depending on the capability of the image reading apparatus and resources.

According to the online storage service, a file such as a document can be stored in a storage of an external computer (an external storage) instead of a user's computer. A user can freely read and write the file from and to an allocated disk space by accessing the external storage via the Internet.

The cloud services enable the user to convert scan data into an image file having a desired data format and store the image file in the external storage without a complicated function provided in the image reading apparatus.

The scan service and the online storage service are, for example, used in cooperation with each other such that the external computer can store an image read by the image reading apparatus as a high-value image file in the external storage. However, when the image read by the image reading apparatus is stored as the image file in the external storage, a position (a storage area) for storing the image file needs to be previously designated. Japanese Patent Application Laid-Open No. 2001-169065 discusses a method for designating a storage area after an image reading apparatus reads a document.

However, in the conventional technique, it can be determined whether the storage area can store the image file in the image reading apparatus only after scanning is executed. Therefore, it is possible that the image file may not be stored in the storage area in which the user desires to store the image file.

In recent years, the online storage service has been usable from the image reading apparatus. However, whether scan data, an image file, or the like can be stored in the external storage from the image reading apparatus depends on a function of the image reading apparatus. Even if the image file can be stored in the storage area where the image file is desirably stored, the external storage needs to be designated from the image reading apparatus according to the conventional technique. If the storage area stores the image file at a hierarchically deep place, the designation of the storage area becomes complicated.

SUMMARY OF THE INVENTION

Aspects of the present invention generally relate to making designation of a storage location easier.

According to an aspect of the present invention, an information processing apparatus includes a memory and a processor, the processor configured to acquire storage location information representing a storage location of an image file in a first external information processing apparatus, from an image reading apparatus, and a control unit configured to determine whether the storage location of the image file can store the image file based on the acquired storage location information, wherein when it is determined that the storage location of the image file can store the image file, acquire screen information used to generate a screen for generating a scan ticket designating a storage location, from a second external information processing apparatus, and display the screen for generating the scan ticket based on the acquired screen information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of scan ticket information.

FIG. 7 illustrates an example of a data structure of a scan ticket storage unit.

FIG. 8 illustrates an example of a user interface.

FIG. 9 illustrates an example of a user interface.

FIG. 14 illustrates an example of a sequence diagram.

DESCRIPTION OF THE EMBODIMENTS

Various exemplary embodiments, features, and aspects of the invention will be described in detail below with reference to the drawings. The exemplary embodiments do not limit the present invention. All configurations described in the exemplary embodiments are not necessarily essential for solving the subject of the present invention.

Figure 1:
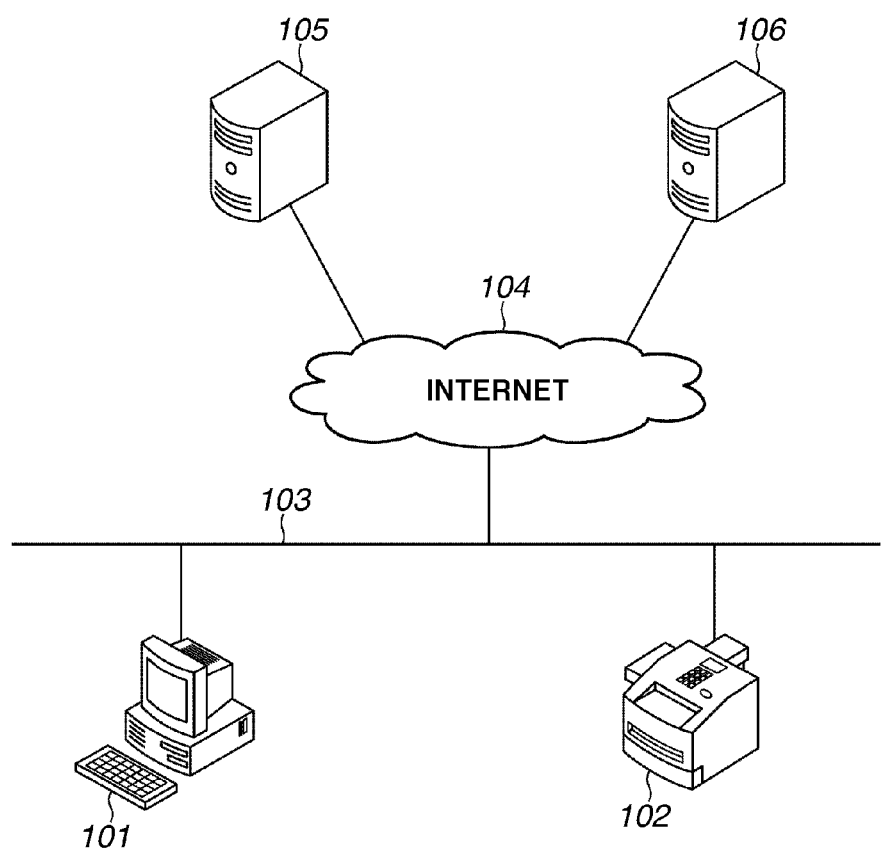
FIG. 1 illustrates an example of a configuration of a system.

FIG. 1 illustrates an example of a configuration of a system according to a first exemplary embodiment. An information processing apparatus 101 is an example of a computer, and is connected to an image reading apparatus 102 via a network 103 capable of communicating a command. The image reading apparatus 102 is an example of an image forming apparatus (e.g., a multifunction peripheral (MFP)). The information processing apparatus 101 and the image reading apparatus 102 are connected to the Internet 104 (an example of a network) via the network 103 capable of communicating a command.

A document management server 105 that provides a storage service is an example of an information processing apparatus (computer), and a scan server 106 that provides a scan service is an example of an information processing apparatus (computer). Each of the document management server 105 and the scan server 106 is connected to the Internet 104, and provides a cloud service such as a storage service or a scan service via the Internet 104.

Further, the present exemplary embodiment may include plurality of the image reading apparatuses 102, the document management servers 105, and the scan servers 10.

Figure 2:
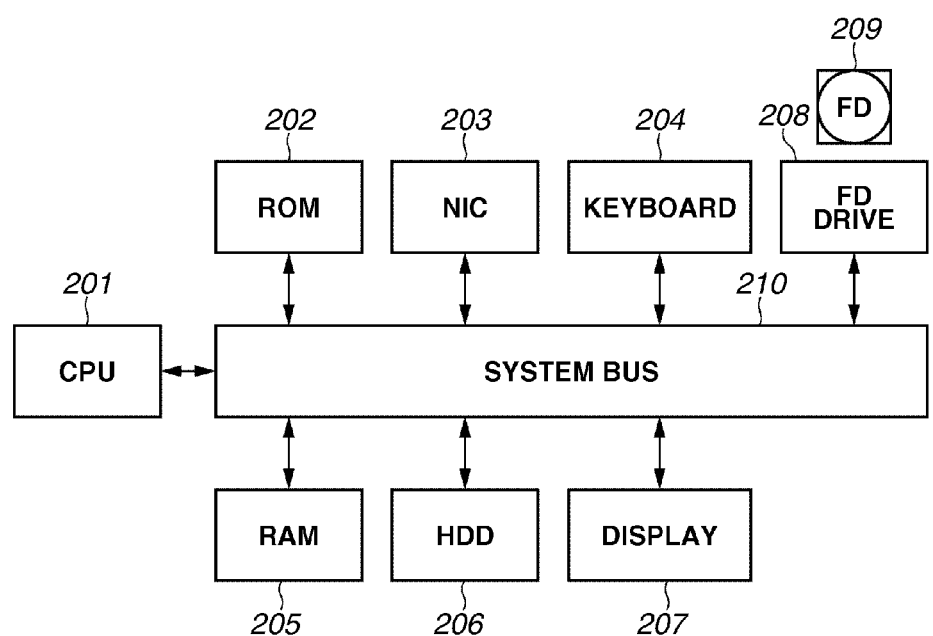
FIG. 2 illustrates an example of a configuration of hardware for an information processing apparatus.

FIG. 2 illustrates an example of a configuration of hardware for the information processing apparatus 101. The scan server 106 and the document management server 105 basically include the same hardware as the hardware illustrated in FIG. 2, and hence description thereof is not repeated.

A central processing unit (CPU) 201 performs a logical operation and various types of control. The CPU 201 executes various application programs, printer driver programs, and operating systems (OSs) stored in a hard disk drive (HDD) 206, and temporarily stores information and files required to execute the programs in a random access memory (RAM) 205.

A read-only memory (ROM) 202 stores programs such as a basic input/output (I/O) program and various types of data such as font data and template data used in performing document processing. A network interface card (NIC) 203 is an example of a network interface. The information processing apparatus 101 exchanges data with an external apparatus via the NIC 203.

A keyboard 204 is an example of an input device, with which a user inputs (designates) an instruction such as a control command to a document management application, described below. The input device is not limited to a keyboard, and may be a pointing device such as a mouse, a touch panel, or a pen tablet.

The RAM 205 is an example of a memory capable of reading and writing data, as needed, and functions as a main memory or a work area of the CPU 201. The HDD 206 is an example of an external storage device, is a hard disk (HD) functioning as a large-capacity memory, and stores an application program, a printer driver program, an OS, a network printer control program, and related programs.

A display 207 is an example of an output device, and displays a command input from the keyboard 204, e.g., a state of the document management application, described below. A program stored in a flexible disk (FD) 209 serving as an example of a storage medium is loaded into the information processing apparatus 101 via an FD drive 208. The FD 209 stores a computer-readable program.

The storage medium is not limited to the FD, and may be a compact disk read only memory (CD-ROM), a compact disk recordable (CD-R), a compact disk rewritable (CD-RW), a PC card, a digital versatile disk (DVD), an integrated circuit (IC) memory card, a magneto-optical disk (MO), or a memory stick. A system bus 210 is a bus for connecting the devices (201 to 208) within the information processing apparatus 101, and controls the flow of data within the information processing apparatus 101.

The image reading apparatus 102 includes basically the same hardware as the information processing apparatus 101, and further includes devices, for example, an image reading apparatus 102 such as a scanner and a printing apparatus such as a printer. However, a configuration of the image reading apparatus 102 is not limited to this configuration, and can be changed, as needed. For example, as an input device and an output device in the image reading apparatus 102, a touch panel may be provided instead of the keyboard 204 and the display 207.

Figure 3:
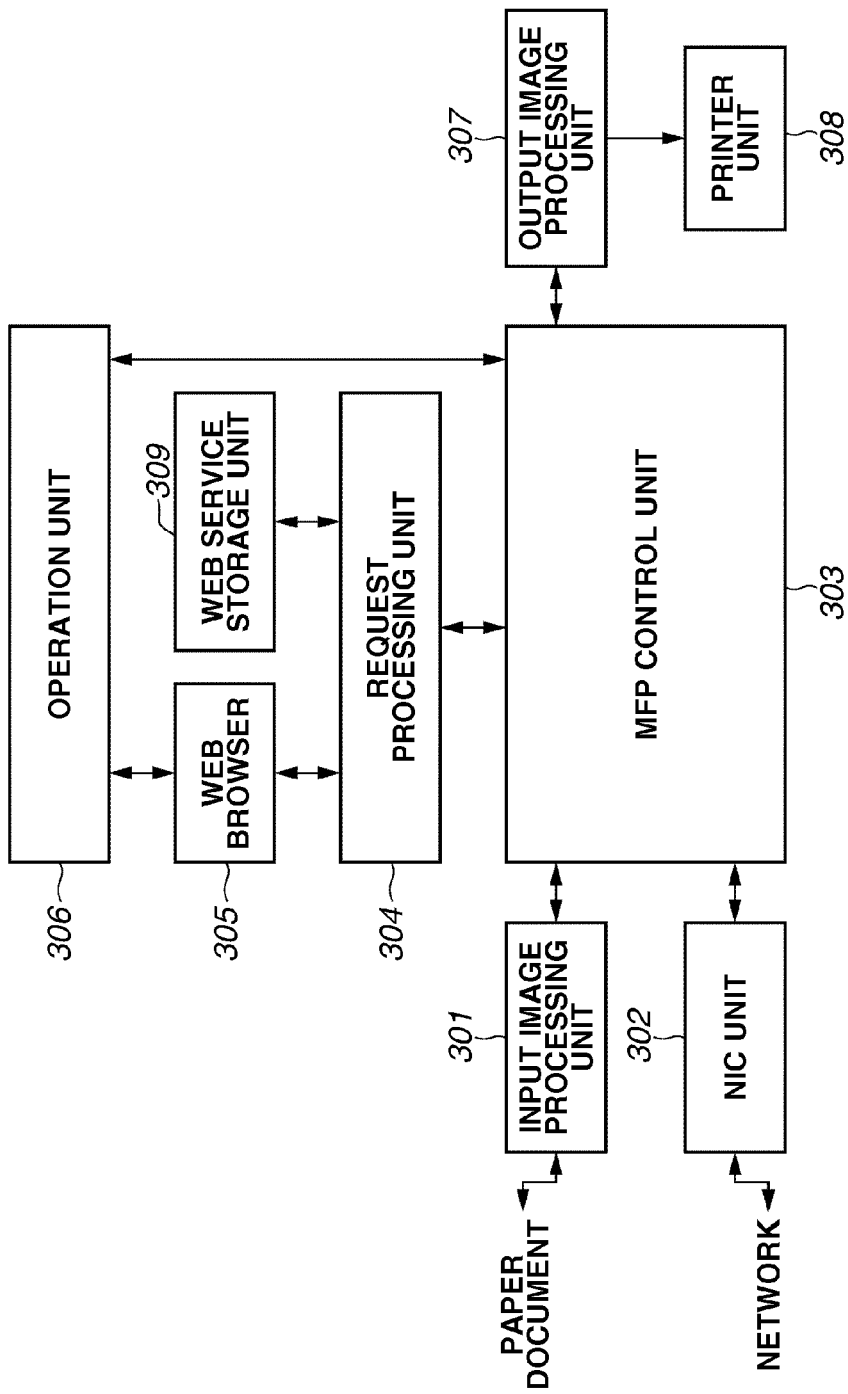
FIG. 3 illustrates an example of a configuration of an image reading apparatus.

FIG. 3 illustrates an example of the configuration of the image reading apparatus 102. An input image processing unit 301 reads a paper document or the like via the image reading apparatus 102, and subjects read image data (scan data) to image processing. The scan data input from the input image processing unit 301 is sent to an MFP control unit 303. The scan data is an example of image information. The image information includes facsimile-received image data.

An NIC unit 302 transfers a request from the outside to a request processing unit 304 using a network, and sends image data, device information, or the like inside the image reading apparatus 102 to the outside via the network. The MFP control unit 303 functions as a traffic control device to control data input to the image reading apparatus 102 and data output from the image reading apparatus 102.

The request processing unit 304 analyzes and executes the request which comes from the outside and is received from a web browser 305 and the NIC unit 302. An execution result is displayed on the display 207 by an operation unit 306 via the web browser 305. Alternatively, the execution result is sent to the external apparatus (cloud service) via the NIC unit 302.

The operation unit 306 displays the web browser 305 on the display 207, and receives an instruction and an input from the user via the web browser 305. A web service storage unit 309 stores information (information about a reference destination) used for connection to the external cloud service (e.g., the scan service).

When the operation unit 306 issues an instruction to execute the external cloud service, the request processing unit 304 sends a request for the cloud service, to a cloud service at the reference destination registered in the web service storage unit 309. In the present exemplary embodiment, the request processing unit 304 sends the request to a scan ticket management unit 501, described below.

An output image processing unit 307 subjects the image data to image processing for printing, and sends the image data to a printer unit 308. The printer unit 308 controls the printing apparatus, feeds sheets and sequentially records (e.g., prints) on the sheets the image data, which has been subjected to the image processing by the output image processing unit 307.

Figure 4:
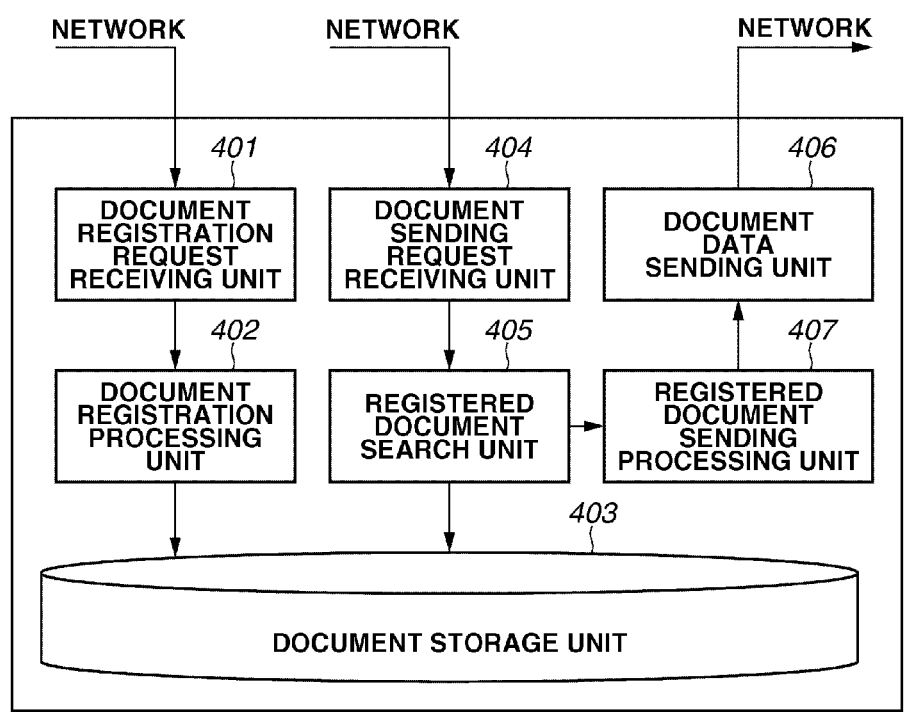
FIG. 4 illustrates an example of a configuration of a document management server.

FIG. 4 illustrates an example of a configuration of the document management server 105. The functional configuration of the document management server 105 may be shared among a plurality of apparatuses.

A document registration request receiving unit 401 receives a request (a document registration request) to register a document (e.g., an image file) from the Internet 104 (the information processing apparatus 101, the scan server 106, etc.). The received document registration request is transferred to a document registration processing unit 402, and is stored in a document storage unit 403 (e.g., the HDD 206) which is an example of a storage area. While the document registration processing unit 402 can manage a cabinet, a folder, and a document in a hierarchical structure when the document is stored in the document storage unit 403, details thereof are omitted.

A document sending request receiving unit 404 receives a request to acquire a document (a document acquisition request) from the Internet 104. The received document acquisition request is transferred to a registered document search unit 405. The registered document search unit 405 reads out the requested document from the document stored in the document storage unit 403. The registered document search unit 405 transfers the read document to a registered document sending unit 407. The registered document sending unit 407 sends the read document to a destination from which the request is sent, via a document data sending unit 406.

Figure 5:
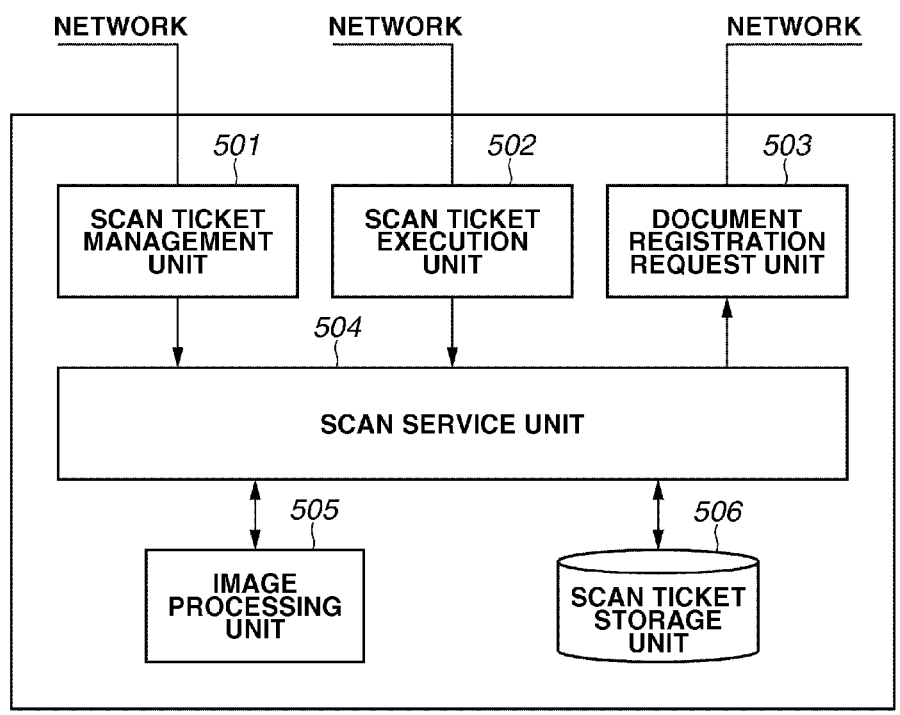
FIG. 5 illustrates an example of a configuration of a scan server.

FIG. 5 illustrates an example of a configuration of the scan server 106. The functional configuration of the scan server 106 may be shared among a plurality of apparatuses.

A scan ticket management unit 501 generates a scan ticket. More specifically, the scan ticket management unit 501 generates the scan ticket when it receives scan setting information sent from the information processing apparatus 101. The scan ticket management unit 501 stores the generated scan ticket in a scan ticket storage unit 506 (e.g., the HDD 206) as scan ticket information (an example of setting information) via a scan service unit 504. The scan ticket information may be sent to other apparatuses (the information processing apparatus 101, the image reading apparatus 102, etc.).

A scan ticket execution unit 502 sends scan ticket list information to the image reading apparatus 102, and executes a scan ticket selected by the image reading apparatus 102 from among the sent scan ticket list information. The scan ticket execution unit 502 requests the scan service unit 504 to acquire the scan ticket list information when it receives a request to acquire the scan ticket list information sent from the image reading apparatus 102.

The scan service unit 504 acquires the scan ticket list information from a scan ticket storage unit 506, and sends the acquired scan ticket list information to the image reading apparatus 102 via the scan ticket execution unit 502.

The scan ticket execution unit 502 receives from the image reading apparatus 102 the scan ticket information designated by the image reading apparatus 102 from among the scan ticket list information sent to the image reading apparatus 102, and the image data read by the image reading apparatus 102. An image processing unit 505 performs image processing for converting the image data into a high-compression PDF or a PDF that has been OCRed (an example of established processing for transforming the image data to higher-value information). A document registration request unit 503 sends a request (a document registration request) to store processed image data (an image file) to the document management server 105, based on the scan ticket information after the processing is performed.

FIG. 6 illustrates an example of the scan ticket information. The scan ticket information includes setting values relating to scan setting items, e.g., a scan ticket identifier (ID), a resolution, a color mode, a magnification, two-sided reading, a reading size, a document file name, a storage destination, and information about OCR processing serving as a flag indicating whether OCR processing is to be performed. The scan ticket information may include information other than the information illustrated in FIG. 6 (another scan setting information, image-related information, document-relation information, etc.), and may include only a part of the information illustrated in FIG. 6.

FIG. 7 illustrates an example of a data structure of the scan ticket storage unit 506 (scan ticket information stored therein). The scan ticket storage unit 506 includes a plurality of scan ticket information, illustrated in FIG. 6, in association with image reading apparatuses. In the present exemplary embodiment, when any of the image reading apparatuses sends a request to execute a scan service, scan ticket list information including one or a plurality of scan ticket information corresponding to the image reading apparatus 102 is sent to the image reading apparatus 102.

FIG. 8 illustrates an example of a user interface (a scan ticket generation screen 801). The scan ticket generation screen 801 is displayed on the display 207 in the information processing apparatus 101 based on an instruction from the CPU 201 in the information processing apparatus 101.

On the scan ticket generation screen 801, the user can designate a resolution, a color mode, a magnification, two-sided reading, a reading size, a document file name, a storage destination, and permission/inhibition of execution of OCR processing. Information (scan setting information) selected on the scan ticket generation screen 801 is sent to the scan server 106 via the Internet 104, and is stored as scan ticket information in the scan ticket storage unit 506.

FIG. 9 illustrates an example of a user interface (a scan ticket selection screen 901). The scan ticket selection screen 901 is displayed on the display 207 in the image reading apparatus 102 by the operation unit 306 based on the scan ticket list information received from the scan server 106.

On the scan ticket selection screen 901, the scan ticket information is displayed in a button format (as a scan ticket button 902). The image reading apparatus 102 sends, when the scan ticket button 902 is selected, the scan ticket information corresponding to the selected scan ticket button 902 and read image data (scan data) to the scan server 106.

Figure 10:
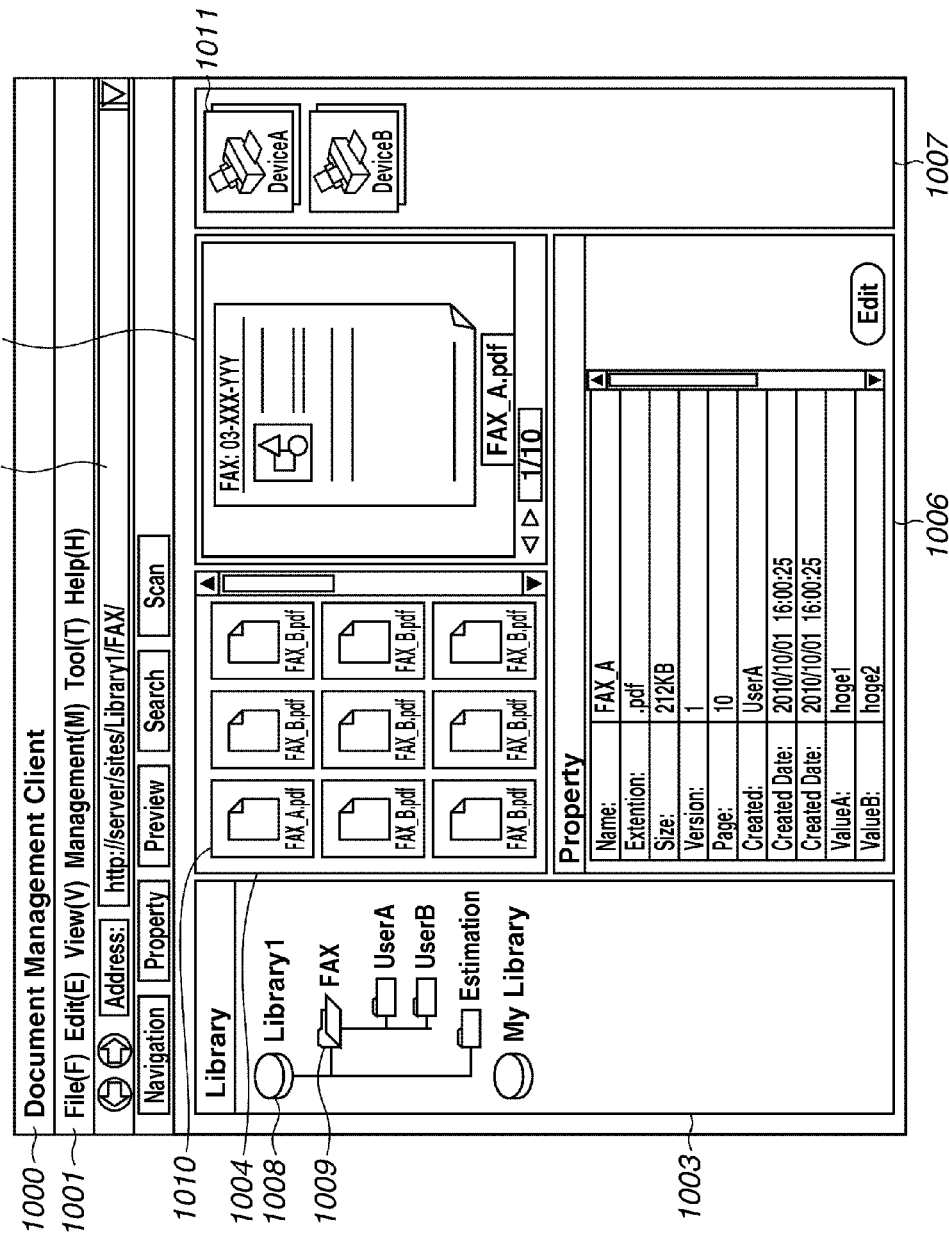
FIG. 10 illustrates an example of a user interface.

FIG. 10 illustrates an example of a user interface (a document management screen 1000). The document management screen 1000 is displayed on the display 207 in the information processing apparatus 101.

A menu bar 1001 displays items (options) for inputting various types of setting values. An address bar 1002 displays a uniform resource locator (URL) representing a storage location of a document (e.g., an image file) represented by a document icon that is being selected in a repository area 1003, a document list area 1004, or the like (an example of address information representing an address of a storage area for storing information). The repository area 1003 displays a library 1008 and a folder 1009 representing a storage destination of a document registered in the document management application in a hierarchical structure.

A document preview area 1005 displays a content of the document selected in the document list area 1004. A document property display and editing area 1006 is an area where a property of the document selected in the document list area 1004 is displayed and the property can be edited. An output list area 1007 lists information about the image reading apparatus 102 (e.g., an image reading apparatus icon 1011) registered in the document management application. When the document is selected in the document list area 1004, and the image reading apparatus icon 1011 is designated, for example, the image reading apparatus 102 represented by the image reading apparatus icon 1011 is instructed to print the document.

A user operates the user interface to perform connection destination setting processing, monitoring target folder setting processing, and movement destination folder setting processing.

Formats (a position, a size, a range, an arrangement, a display content, etc.) of the user interface are not limited to illustrated formats. For example, the formats displayed in the document list area 1004 and the output list area 1007 are not limited to a thumbnail or an icon. For example, the document list area 1004 and the output list area 1007 may display a character string such as a file name for specifying a document or a device name for specifying a peripheral device in a list format.

Figure 11:
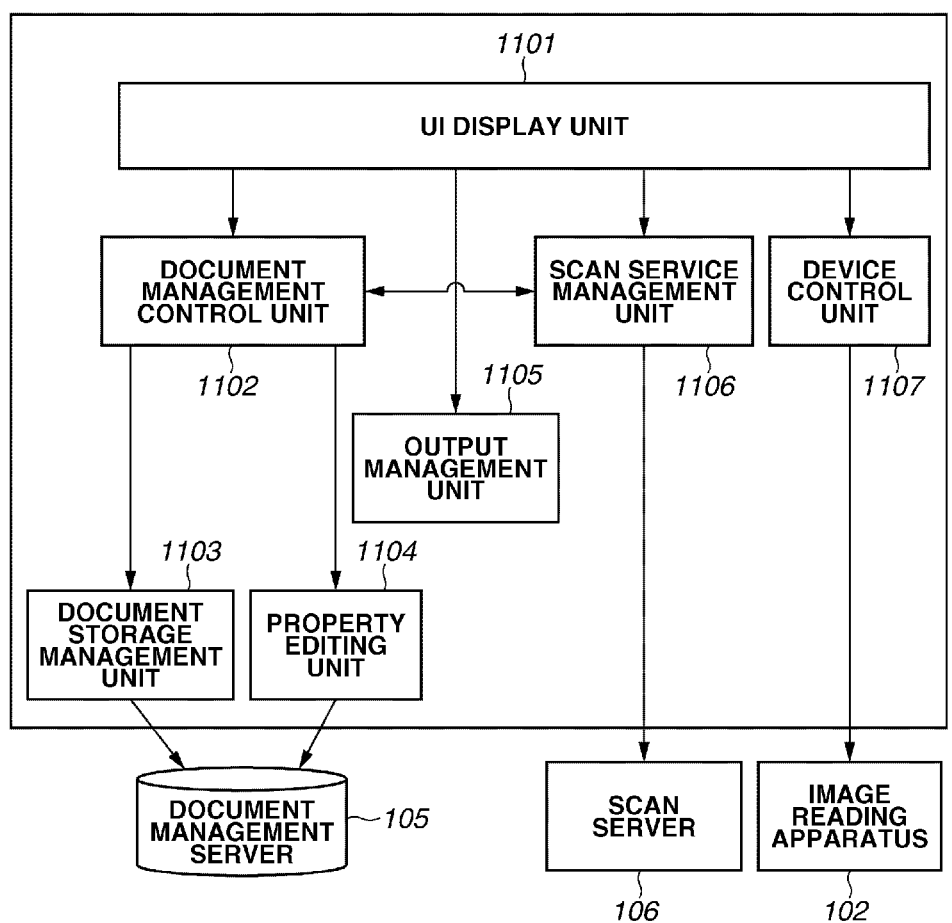
FIG. 11 illustrates an example of a configuration of software that operates in an information processing apparatus.

FIG. 11 illustrates an example of a configuration of software that operates in the information processing apparatus 101. A UI display unit 1101 displays the scan ticket generation screen 801, the document management screen 1000, or the like on the display 207 in the information processing apparatus 101. A document management control unit 1102 requests a document designated by the UI display unit 1101 of a document storage management unit 1103 in order to display the document. The document storage management unit 1103 is connected to the document management server 105, to send a document acquisition request and acquire a desired document.

When an instruction to edit a property of the document is issued, an instruction is given from the UI display unit 1101 to the document management control unit 1102. The document management control unit 1102 requests a property editing unit 1104 to edit the property. The property editing unit 1104 performs editing for the document management server 105.

An output management unit 1105 controls printing of the document. A scan service management unit 1106 is connected to the scan server 106, to acquire information used to generate a screen for generating a scan ticket (a scan ticket generation screen). A device control unit 1107 is connected to the image reading apparatus 102, for example, to determine whether the image reading apparatus 102 can be connected to the scan server 106.

Figure 12:
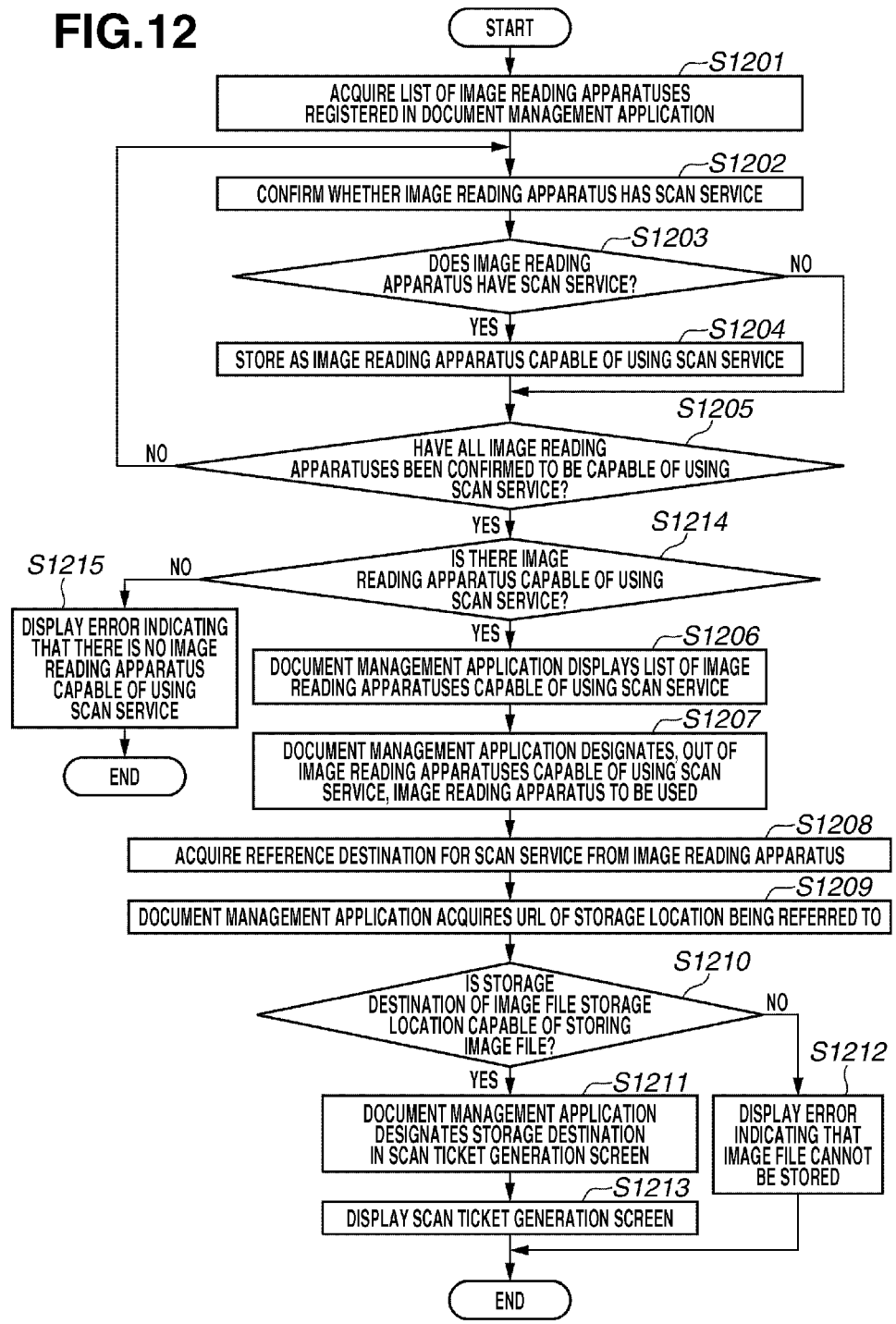
FIG. 12 illustrates an example of a flowchart relating to display processing.

Processing (display processing) for the document management application to determine the image reading apparatus 102 capable of using a scan service and display a scan ticket generation screen will be described below with reference to FIG. 12. FIG. 12 illustrates an example of a flowchart relating to the display processing. A program of the document management application for performing processing relating to the flowchart is stored in the HDD 206, and is read out to the RAM 205 and executed by the CPU 201. Another software or dedicated hardware may perform a part of processing, described below, which is performed by the document management application.

In step S1201, the document management application acquires information about image reading apparatuses registered in the HDD 206 by the device control unit 1107.

In step S1202, the document management application confirms whether an acquired image reading apparatus 102 can use a scan service. Any appropriate method can be used as a method for confirming whether the scan service can be used. For example, the document management application inquires of the image reading apparatus 102 whether a scan service exists that can be used, and determines whether the scan service can be used depending on a response from the image reading apparatus 102.

In step S1203, the document management application determines whether the image reading apparatus 102 can use the scan service. If the document management application determines that the scan service can be used (YES in step S1203), the processing proceeds to step S1204. On the other hand, if the document management application determines that the scan service cannot be used (NO in step S1203), the processing proceeds to step S1205.

In step S1204, the document management application stores information about the image reading apparatus 102 serving as a processing target as a usable image reading apparatus in the RAM 205. In step S1205, the document management application determines whether all the image reading apparatuses, which have been acquired in step S1201, are confirmed to be capable of using a scan service. If the document application determines that there is no image reading apparatus 102 that has not yet been confirmed (YES in step S1205), the processing proceeds to step S1214. On the other hand, if the document management application determines that there is an image reading apparatus 102 that has not yet been confirmed (NO in step S1205), the processing returns to step S1202.

In step S1214, the document management application confirms whether there is an image reading apparatus 102 capable of using a scan service and whether information about the image reading apparatus 102 capable of using a scan service is stored in the RAM 205, according to the present exemplary embodiment. If the document management application determines that there is an image reading apparatus 102 capable of using a scan service (YES in step S1214), the processing proceeds to step S1206. On the other hand, if there is no image reading apparatus 102 capable of using a scan service (NO in step S1214), the processing proceeds to step S1215. In step S1215, the document management application displays an error indicating that there is no image reading apparatus 102 capable of using a scan service, and the processing ends.

Figure 13:
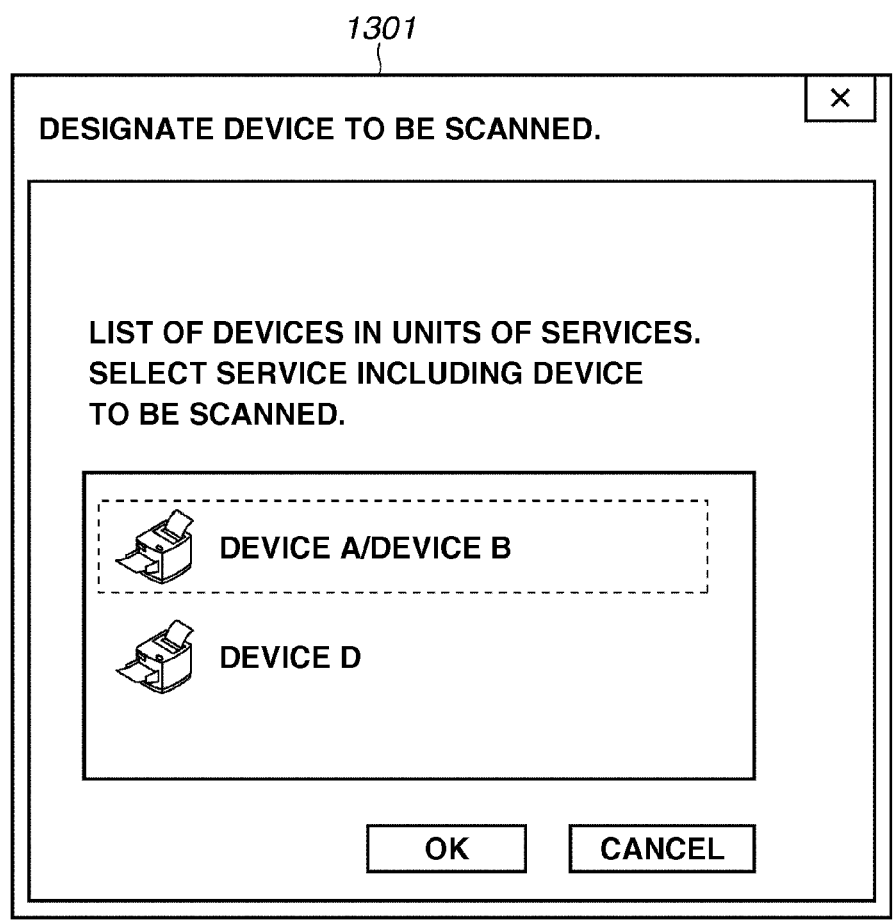
FIG. 13 illustrates an example of a user interface.

In step S1206, the document management application displays a list of image reading apparatuses capable of using a scan service (see, e.g., a screen 1301 illustrated in FIG. 13). In step S1207, the document management application then designates, out of the image reading apparatuses capable of using a scan service, the image reading apparatus 102 to be used based on a user operation.

In step S1208, the document management application then acquires from the designated image reading apparatus 102 information representing storage locations (reference destinations: an example of storage location information) of a document management service that can be referred to with a scan service that can be used by the image reading apparatus 102. In step S1209, the document management application then acquires, out of the storage locations (positions) that can be referred to in the repository area 1003, a URL of the storage location in the repository area 1003, which is currently being referred to, from the address bar 1002 or the like.

In step S1210, the document management application compares the information representing the storage locations (the reference destinations), which have been acquired in step S1208, with the URL acquired in step S1209, and confirms whether a storage destination of an image file is a storage location capable of storing the image file. The document management application determines, if it can access the reference destination, e.g., if it determines that any of the reference destinations matches the URL, that the storage destination of an image file is the storage location capable of storing the image file. If the document management application determines that the storage destination of an image file is the storage location capable of storing the image file (YES in step S1210), the processing proceeds to step S1211. On the other hand, if the document management application determines that the storage destination of an image file is not the storage location capable of storing the image file (NO in step S1210), the processing proceeds to step S1212.

In step S1212, the document management application displays an error indicating that an image file cannot be stored. In step S1211, the document management application sends a storage destination (the URL acquired in step S1209) to the scan server 106, and acquires information (e.g., screen information) used to generate a scan ticket generation screen in which a storage destination has been designated, from the scan server 106. In step S1213, the document management application displays the scan ticket generation screen on the display 207.

FIG. 13 illustrates an example of a user interface (a screen 1301 representing a list of image reading apparatuses capable of using a scan service). While devices are displayed in units of scan services in FIG. 13, a display method is not limited to this.

FIG. 14 illustrates an example of a sequence relating to the system according to the present exemplary embodiment. In this sequence, processing for displaying a scan ticket generation screen, which is performed when one image reading apparatus (the image reading apparatus 102) is a target apparatus, will be described.

In step S1401, the information processing apparatus 101 (the document management application) confirms whether the image reading apparatus 102 can use (has) a scan service. In step S1402, the information processing apparatus 101 acquires from the image reading apparatus 102 information representing storage locations (reference destinations) for a document management service that can be referred to by a scan service usable by the image reading apparatus 102. In step S1403, the information processing apparatus 101 acquires a URL for the document management service, which is currently being referred to, from the address bar 1002 or the like.

In step S1404, the information processing apparatus 101 connects, when it determines that any of the reference destinations acquired in step S1402 matches the URL acquired in step S1403, to the scan server 106 for the scan service of which the reference destination has been acquired from the image reading apparatus 102. In step S1405, the information processing apparatus 101 designates a storage destination (the URL acquired in step S1403), and requests information used to generate a scan ticket generation screen.

In step S1406, the scan server 106 returns the information used to generate the scan ticket generation screen which designates the storage destination, in response to the request. In step S1407, the information processing apparatus 101 displays the scan ticket generation screen on the display 207 based on the information used to generate the scan ticket generation screen.

In the above-mentioned configuration, setting information relating to scanning including information about the storage location can be previously registered. The storage location can be stored via the scan server 106 from the image reading apparatus 102. Therefore, complexity in designating the storage location during scan execution can be reduced.

Figure 15B:
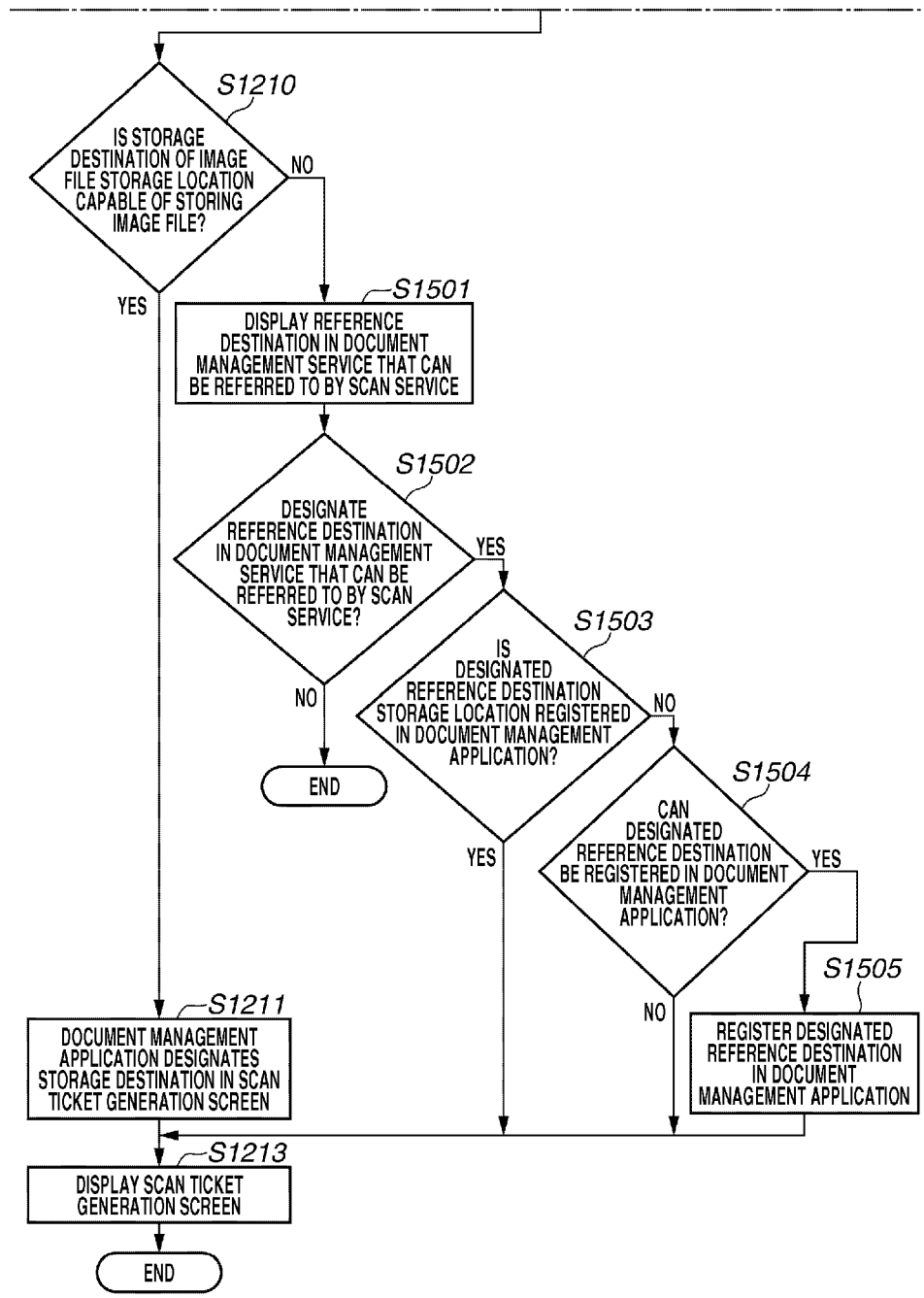
FIG. 15 (15A-15B) illustrates an example of a flowchart relating to display processing.

With reference to FIG. 15 (FIG. 15A-15B), another configuration according to a second exemplary embodiment will be described, in a case where it is determined that a reference destination of a scan service which can be used by the designated image reading apparatus is not a location for storage ( ) (a case where the answer is negative in step S1210 in the first exemplary embodiment). FIG. 15 (FIG. 15A-15B) illustrates an example of a flowchart relating to display processing. In FIG. 15 (FIG. 15A-15B), the same processes as those in the flowchart illustrated in FIG. 12 are assigned the same reference numerals, and hence description thereof is not repeated, unless needed.

In step S1210, a document management application compares the reference destination acquired in step S1208 with a URL acquired in step S1209, and confirms whether a storage destination of an image file is a storage location capable of storing the image file. If the document management application determines that the storage destination of an image file is the storage location capable of storing the image file (YES in step S1210), the processing proceeds to step S1211. On the other hand, if the document management application determines that the storage destination of an image file is not the storage location capable of storing the image file (NO in step S1210), the processing proceeds to step S1501.

In step S1501, the document management application displays the information acquired in step S1208 which represents the storage locations (the reference destinations) in the document management service that can be referred to by the scan service, on the display 207. In step S1502, the document management application confirms whether it has received a user operation for designating, out of the displayed reference destinations, the reference destination serving as a storage destination. If the document management application determines that the user operation for designating the reference destination has been received (YES in step S1502), the processing proceeds to step S1503. On the other hand, if the document management application determines that the user operation for designating the reference destination has not been received (NO in step 1502), the processing ends.

In step S1503, the document management application confirms whether the designated reference destination (storage destination) is the storage location in the document management service registered in the document management application (HDD 206). For example, the document management application confirms whether the designated reference destination is a URL of a storage location other than the storage location that is currently being referred to in the document management service. Further, the document management application confirms whether the designated reference destination is a URL of a storage location in a document management service different from the document management service registered in the document management application.

If the document management application determines that the designated reference destination is the storage location in the registered document management application (YES in step S1503), the document management application sends the storage destination to the scan server 106, and acquires from the scan server 106 information used to generate a scan ticket generation screen in which the storage destination has been designated, and the processing proceeds to step S1213. On the other hand, if the document management application determines that the designated reference destination is not the registered storage location in the document management service (NO in step S1503), the processing proceeds to step S1504.

In step S1504, the document management application confirms whether the designated reference destination can be registered in the document management application. Any appropriate method can be used as a method for confirming whether the designated reference destination can be registered. For example, the document management application inquires of the document management service 105 whether the designated reference destination can be referred to, and checks whether the designated reference destination can be registered depending on a response from the document management service 105.

If the document management application determines that the designated reference destination can be registered (YES in step S1504), the processing proceeds to step S1505. On the other hand, if the document management application determines that the designated reference destination cannot be registered (NO in step S1504), the processing proceeds to step S1213. In step S1505, the document management application registers the designated reference destination in the HDD 206. Thus, on the document management screen 1000, for example, the designated reference destination is displayed as a library or a folder in the repository area 1003.

According to the present exemplary embodiment, complexity in designating the storage location during scan execution can be further decreased.

Other Embodiments

The exemplary embodiments are not limited to the above-mentioned configurations. For example, an information processing apparatus 101 acquires information about an image reading apparatus 102 capable of using a scan service, from a scan server 106 when it is connected to the scan service 106 (e.g., in step S1404). When the information processing apparatus 101 determines that there exists an image reading apparatus 102 that has not been registered in a list of image reading apparatuses, which a document management application manages, the information processing apparatus 101 may notify a user of the image reading apparatus 102 that has not been registered.

A method for generating a scan ticket generation screen is not limited to those in the above-mentioned configurations. For example, the document management application acquires information used to generate the scan ticket generation screen from the scan server 106 without sending a storage destination to the scan server 106. More specifically, the document management application may generate a scan ticket generation screen which designates a storage destination by use of the storage destination and the information acquired from the scan server 106 and used to generate the scan ticket generation screen.

Embodiments of the present invention can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above-mentioned configurations according to the exemplary embodiments can be employed in combination, as needed.

According to the above-mentioned configurations according to the exemplary embodiments, the storage destination can be more easily designated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-074852 filed Mar. 28, 2012, which is hereby incorporated by reference herein in its entirety.

What is claimed is:

1. An information processing apparatus comprising:
a memory; and
a processor, wherein the processor functions as:
an acquisition unit configured to acquire, from an image reading apparatus, storage location information representing a storage location for an image file in a first external information processing apparatus;
a control unit configured to determine whether the storage location for the image file can store the image file based on the acquired storage location information; and
a display unit configured to display a screen for generating a scan ticket;
wherein, in response to the determination that the storage location for the image file can store the image file, the acquisition unit acquires, from a second external information processing apparatus, screen information used to generate the screen for generating the scan ticket, the control unit creates, based on the acquired storage location information and screen information, the screen for generating the scan ticket, and the display unit displays the screen for generating the scan ticket which includes the acquired storage location.

2. The information processing apparatus according to claim 1, wherein the control unit is further configured to generate a list of image reading apparatuses which use a scan service and to receive a user selection of an image reading apparatus from the list of image reading apparatuses, and
the acquisition unit is further configured to acquire, from the user selected image reading apparatus, the storage location information representing the storage location of the image file in the first external information processing apparatus.

3. The information processing apparatus according to claim 1, wherein the image file is stored in the acquired storage location for the image file in the first external information processing apparatus after the second external information processing apparatus generates the image file based on image data, wherein the image data is acquired by the second external information processing apparatus from the image reading apparatus.

4. The information processing apparatus according to claim 1, wherein
the control unit is further configured to verify the storage location for the image file in the first external information processing apparatus, and, in response to verifying the storage location for the image file in the first external information processing apparatus, determine that the storage location for the image file can store the image file based on the acquired storage location information.

5. A control method comprising:
acquiring, from an image reading apparatus, storage location information representing a storage location for an image file in a first external information processing apparatus; and
determining whether the storage location for the image file can store the image file based on the acquired storage location information,
in response to determining that the storage location for the image file can store the image file, acquiring, from a second external information processing apparatus, screen information used to generate a screen for generating a scan ticket;

creating the screen for generating the scan ticket based on the acquired storage location and the acquired screen information; and displaying the created screen for generating the scan ticket.

6. The control method according to claim 5 further comprising:

generating a list of image reading apparatuses that use a scan service, receiving a selection of an image reading apparatus from the list of image reading apparatuses, and acquiring, from the selected image reading apparatus, the storage location information representing the storage location for the image file in the first external information processing apparatus.

7. The control method according to claim 5, wherein the image file is generated by the second external information processing apparatus based on image data and stored in the storage location for the image file, wherein the image data is acquired from the image reading apparatus by the second external information processing apparatus.

8. The control method according to claim 5 further comprising:

verifying that the storage location for the image file in the first external information processing apparatus; and in response to verifying the storage location for the image file in the first external information processing apparatus, determine that the storage location for the image file can store the image file based on the acquired storage location information.

9. A non-transitory computer-readable storage medium storing a program for causing a computer to execute a control method, the method comprising:

acquiring, from an image reading apparatus, storage location information representing a storage location for an image file in a first external information processing apparatus;

determining whether the storage location for the image file can store the image file based on the acquired storage location information;

in response to determining that the storage location for the image file can store the image file, acquiring, from a second external information processing apparatus, screen information used to generate a screen for generating a scan ticket designating a storage location;

creating the screen for generating the scan ticket based on the acquired screen information and the acquired storage location; and displaying the screen for generating the scan ticket.

* * * * *